(12) United States Patent  
Swaminathan (10) Patent No.: US 8,745,750 B2  
(45) Date of Patent: Jun. 3, 2014

(54) ORIGINATION VERIFICATION USING EXECUTION TRANSPARENT MARKER CONTEXT

(75) Inventor: Balasubramanian Swaminathan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 193 days.

(21) Appl. No.: 13/091,799

(22) Filed: Apr. 21, 2011

(65) Prior Publication Data

US 2012/0272323 A1    Oct. 25, 2012

(51) Int. Cl.
*G06F 21/00*    (2013.01)

(52) U.S. Cl.
USPC ............................................. 726/26; 713/176

(58) Field of Classification Search
None
See application file for complete search history.

(56) References Cited

U.S. PATENT DOCUMENTS

| | | | |
|---|---|---|---|
| 5,694,569 A | 12/1997 | Fischer | |
| 6,070,160 A * | 5/2000 | Geary | 1/1 |
| 6,971,018 B1 | 11/2005 | Witt et al. | |
| 7,577,848 B2 | 8/2009 | Schwartz et al. | |
| 2005/0171961 A1 | 8/2005 | Culbreth et al. | |
| 2007/0271599 A1* | 11/2007 | Rosenstein | 726/4 |
| 2008/0134337 A1 | 6/2008 | Crescenzo et al. | |
| 2009/0228533 A1 | 9/2009 | Reddy et al. | |
| 2010/0037062 A1* | 2/2010 | Carney | 713/176 |

OTHER PUBLICATIONS

Altervista—"Tutorial for Digitally signing HTML sources" Sep. 15, 2008 pp. 1-15.*
James Alen—Main GPG—How to : Oct. 17, 2009 p. 1-9.*
IBM—IBM server iSeries Information Center Version 5 Release 3 (V5R3) Copyright IBM 2002-2005, pp. 1-2.*
How to sign or verify any type of file's (.txt, .dat, .doc, .jpg etc etc) in VB 6 or VB.net, Feb. 16, 2011 (Retrieved Date), (11 pages).
Detecting File Changes, Feb. 16, 2011 (Retrieved Date), (2 pages).
Description of the Windows File Protection feature, Feb. 16, 2011 (Retrieved Date), (3 pages).
"Safeguard your Office 2007 files with encryption, document protection, and digital signatures", Apr. 17, 2007, www.techrepublic.com/article/safeguard-your-office-2007-files ... (16 pages).

* cited by examiner

*Primary Examiner* — Oscar Louie
*Assistant Examiner* — Younes Naji
(74) *Attorney, Agent, or Firm* — Tom Wong; Sade Fashokun; Micky Minhas (57) ABSTRACT

The use of a marker in a file to assist in the signing and/or verification of the file. The marker is recognized by the signing authority. The marker has a certain execution transparent context that reduces or eliminates the impact of the marker on execution. A signing authority accesses the file, finds the marker within the file, and identifies the execution transparent context system. The signing authority then uses the execution transparent context system to insert a signature with the same execution transparent context. A verification system finds the marker, identifies the execution transparent context of the marker, identify the execution transparent signature, and uses the execution transparent context system to then extract the signature from the execution transparent signature. That signature may then be used to verify that the file has not changed since it was signed.

17 Claims, 5 Drawing Sheets

ORIGINATION VERIFICATION USING EXECUTION TRANSPARENT MARKER CONTEXT

BACKGROUND

A software product typically includes multiple files such as executables, binaries, data-files, scripts, content files, and/or configuration files, and so forth. The making of such a software product available for consumer use is often referred to as a "release". Once released, most of these files could be updated on purpose or maliciously without the permission of the product provider or consumer. Such changes could degrade the functionality of the product, or cause it to act in unintended ways.

Some programs or software systems or products guard against such changes by verifying file signatures. However, this conventional method does not handle all file types and is not generic across all environments.

BRIEF SUMMARY

At least one embodiment described herein relates to the use of a marker in a file to assist in the signing and/or verification of the file. For instance, the author may insert the marker into the file. The marker is recognized and perhaps even dictated by the signing authority computing system as being a signal as to how to place a signature in the file. The marker has a certain execution transparent context that reduces or eliminates the impact of the marker on execution. For instance, the marker may be placed in a comment line.

In one embodiment, the signing authority computing system accesses the file, finds the marker within the file, and identifies the execution transparent context system of the file based on the execution transparent context of the marker. The signing authority computing system then uses the execution transparent context system to insert a signature that also has a similar execution transparent context as compared to that of the marker.

In one embodiment, a verification system may access the file having the execution transparent marker, and the execution transparent signature. The verification system finds the marker, and identifies the execution transparent context of the marker. The verification system then uses the execution transparent marker in the file to also identify the execution transparent signature in the file. The verification system uses the execution transparent context system to then extract the signature from the execution transparent signature. That signature may then be used to verify that the file has not changed since it was signed. For instance, the verification system may remove the execution transparent signature from the file, compare the file against the signature, to thereby verify the origination and content origination of the file.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the use of a marker in a file to assist in the signing and/or verification of the file is described. The marker is recognized by a signing authority as well as by verification systems. The marker pattern or marker bytes or maker structure, hereinafter referred to as marker, is dictated, or at least recognized, by the signing authority and is shared by the verification systems of the signing authority. The marker has a certain execution transparent context that reduces or eliminates the impact of the marker on validity of the file for the purpose for this it is created. The file could be any kind of file including perhaps content files like a word processing document, or a movie file.

A signing authority accesses the file, finds the marker within the file, and identifies the execution transparent context system. For example, the execution transparent context system could be prefix or post fix bytes or both prefix and postfix bytes. The signing authority then uses the execution transparent context system to insert a signature with the same execution transparent context. A verification system finds the marker, identifies the execution transparent context of the marker, uses the structure of the bytes surrounding the execution transparent marker in the file to identify the execution transparent signature located elsewhere in the file, and uses the execution transparent context system to then extract the signature from the execution transparent signature. That signature may then be used to verify that the file has not changed since it was signed. First, some introductory discussion regarding computing systems will be described with respect to FIG. 1. Then, the embodiments of the marking, signing, and verification process will be described with respect to FIGS. 2 through 6.

Figure 1:
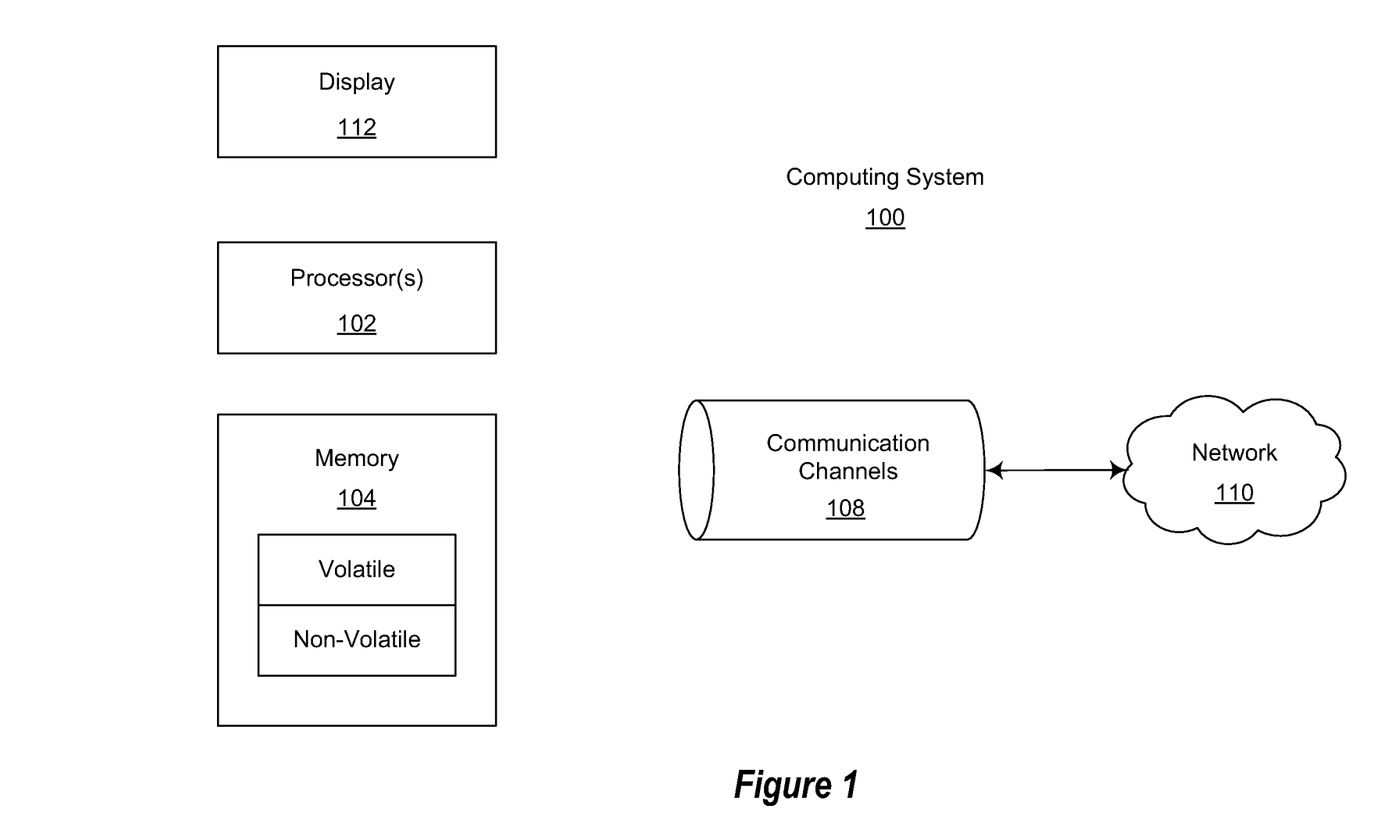
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system may also include a display 112 that may display one or more user interfaces that a user of the computing system may interface with.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
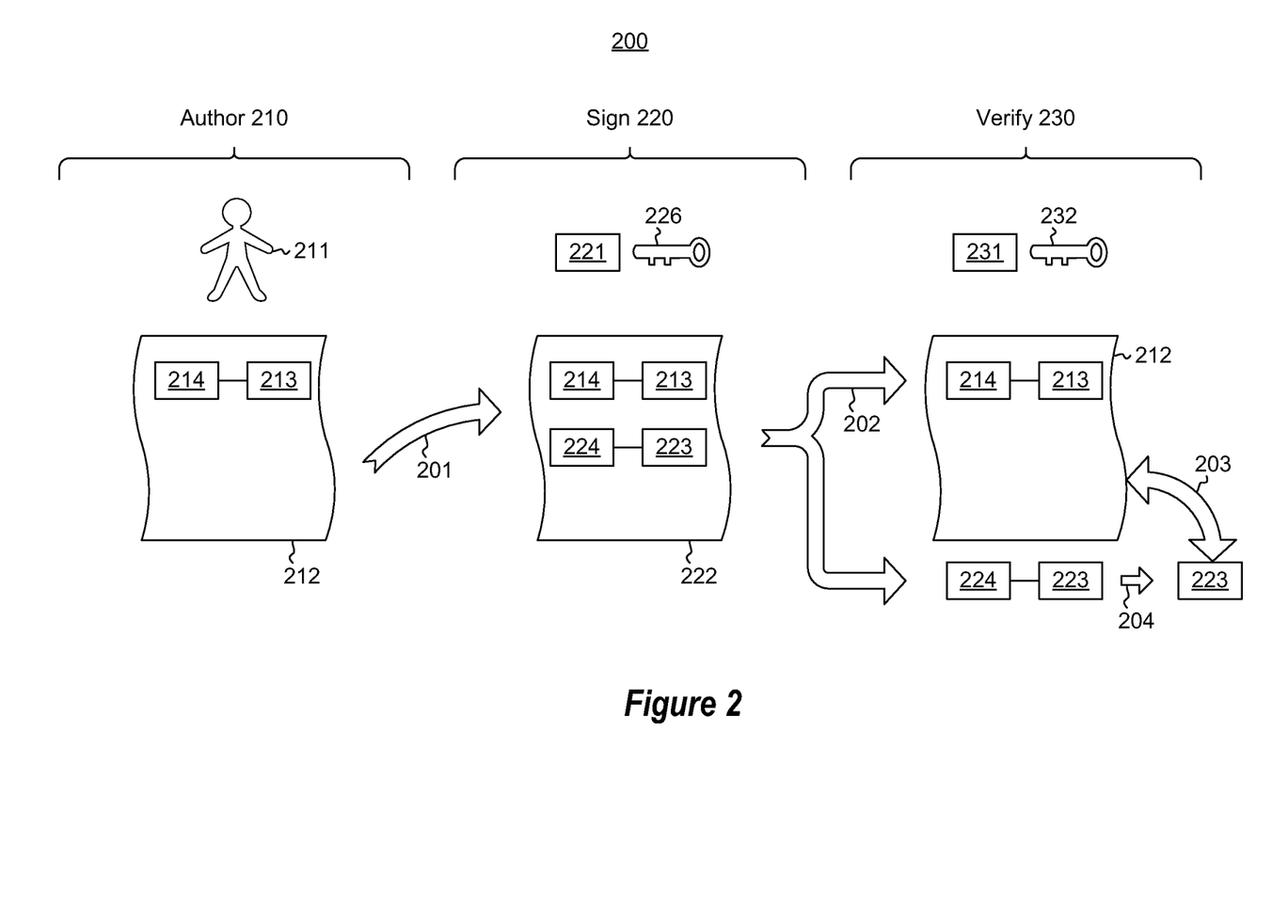
FIG. 2 illustrates an environment that includes three phases; an authoring phase, a signing phase and a verification phase.

FIG. 2 illustrates an environment 200 that includes three phases; an authoring phase 210, a signing phase 220 and a verification phase 230. After briefly introducing the function of each phase, the functions of the phases 210 and 220 will be described in more detail with respect to FIGS. 3 and 4, respectively, and the verification phase 230 will be described in further detail with respect to FIGS. 5 and 6.

In the authoring phase 210, an author 211 (which may be human and/or a computerized component) generates a file 212 that includes a marker 213 that is placed in the file in a certain execution transparent context 214. The marker is predetermined data defined and/or dictated (or at least recognized) by the signing authority computing system. The marker could be any bytes or character strings which will be uniquely identifiable by the signing authority and verification system. The file 212 may then be provided to a signing authority as represented by arrow 201. As previously mentioned, the file 212 may be any type of file including, as examples only, text files, binary files, content files, or the like.

In the signing phase 220, the signing authority 221 modifies the file 212 to generate a modified file 222 that includes a signature 223 that is also included in the file 222 using the same execution transparent context 224 as the execution transparent context 214 as the marker 213. The signature 223 may be generated using a private key 226 available only to the signing authority 221. Using the principles described herein, the signing authority 221 can sign files even if the signing authority 221 had never before encountered a file of a particular type, and even if the signing authority is not aware of the execution buffer context system used by that particular file type. The signed file is then provided to the verification phase 230. In this description and in the claims, "signing" means generating a hash of the file, and encrypting that hash with a private key. For instance, in one embodiment, the signature is a hash (SHA256) of the contents of the file encrypted using a RSA private key and stored within the file. The public key is freely distributable and the private key is guarded by the signing authority 221.

In a verification phase 230, the consuming software or program invokes the verification subsystem and (which has access to the public key corresponding to the private key of the signing authority) verification entity 231 also finds the marker 213. The verification phase 230 discovers the execution transparent context 214 of the marker, and extracts the execution transparent signature (i.e., the combination of 223 and 224) from the file 222 to thereby regenerate the unsigned file 212 (represented by arrow 202). The signature 223 is then extracted from the execution transparent signature (represented by arrow 204). The signature 223 may then be compared (represented by arrow 203) with the unsigned file 212 (using the hash algorithm and a public key 232) to verify that the signed file had not changed since it was signed.

Figure 3:
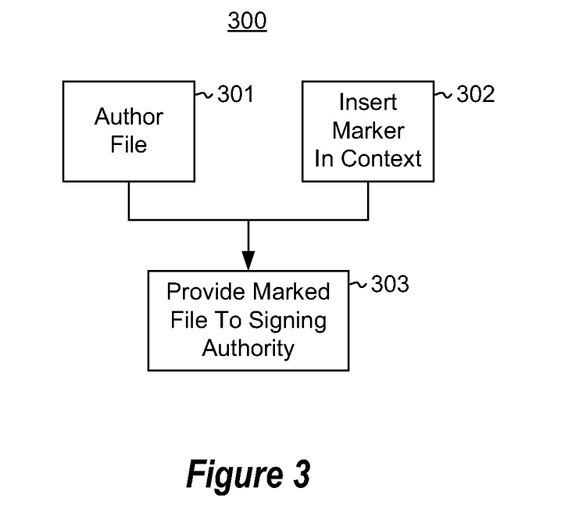
FIG. 3 illustrates a flowchart of a method for authoring of file using a marker.

FIG. 3 illustrates a flowchart of a method 300 for authoring a file using a marker dictated by the authority. Marker, as defined in this document could be a series of continuous or non-continuous bytes, characters or other data entities consumed by software program. The method 300 may be performed, for example, in the authoring phase 210 of FIG. 2. The method 300 includes an act of authoring a file (act 301), and inserting the marker into the file (act 302) in a particular execution transparent context as dictated by the consuming software. These acts are shown in parallel since the marker may be inserted before the authoring of the file is completed or after, without restriction. The authoring of the file could be performed by a human being interacting with a computing system, such as the computing system 100 of FIG. 1. On the other hand, the file could be authored or otherwise generated automatically by a computing system without human interaction. The file may be any type of file. As an example, the file could be a text file such as an eXtensible Markup Language (XML) file. The file might also be binary to the extent that the binary allows markers to be inserted using an execution transparent context system. The file might also be a content file, such as a movie file, or a word processing document, or an audio file. In the more specific examples below, however, the files are text files simply because those examples might be easier for the reader to follow than showing examples of binary files, which are typically less human-readable.

Once authored (act 301) with the marker inserted into the file (act 302), the marked file is provided to the signing authority (act 303). For instance, referring to FIG. 2, the file 212 (authored with the marker 213 within an executing transparent context 214) is provided (arrow 201) to the signing authority 221.

The principles described herein may be applied to any file type that is in a format that provides for an execution transparent context system, which is a mechanism for inserting information into a file with reduced or no impact on execution or evaluation of the file or contents of the file. For instance, many source code files are in a particular code format that has a commenting system in which information (e.g., text comments) may be inserted without the inserted text being compiled into actual executable binary. To partially demonstrate how flexible the principles described herein are, four specific examples will now be described: two applying to an eXtensible Markup Language (XML) document, one applying to a MICROSOFT® PowerShell (PS1) file, and the last applying to a BAT file. The demonstration of the principles of the invention herein after does not exclude or restrict the application of this invention to other file types and computer program or software.

A first example (hereinafter referred to as the "first XML example") of a simple XML file with a marker inserted is provided as follows:

```
<!--Signature here-->
<Person>
</Person>
```

Here, the XML file includes a simple "Person" element. However, a marker, as dictated by the signing authority used for this demonstration, "Signature here" has been inserted. The marker is placed within the file in a certain execution transparent context (with a prefix of "<!--" and with a suffix of "-->". In XML files, the use of such a prefix and suffix embeds the marker "signature here" within a commenting system context, such that the marker is ignored when the XML file is parsed and evaluated.

A second example (hereinafter referred to as the "second XML example") of an XML file with a marker is as follows:

```
<!--
Signature here
-->
<Person>
</Person>
```

Here, the marker, as dictated by the signing authority used for this demonstration, is again "Signature here". When the line of the marker is evaluated on its own, the execution transparent context includes no prefix or suffix, but the marker is positioned within the commenting system when considering surrounding lines.

The following is an example (hereinafter referred to as the "ps1 example") of a Microsoft PowerShell (ps1) file that includes a marker within a commenting context that is appropriate for MICROSOFT PowerShell files:
Signature here
dir c:\

Here, again the marker is "Signature here" (the text "dir c:\" is simply just a sample content of the file). Evaluating the remainder of that line, there is a prefix "#" and no suffix, which is an appropriate commenting (and execution transparent context) context for a ps1 file, resulting in the marker being ignored during execution and/or evaluation of the file.

The following example (hereinafter referred to as the "BAT example") is of a BAT file that includes a marker within a commenting context that is appropriate for a BAT file:
REM Signature here
dir c:\temp Here, again the marker is "Signature here", as dictated by the signing authority used for this demonstration (the text "dir c:\temp" is simply just a sample content of the file). Thus, regardless of the file type, the marker may be the same. However, the marker could instead be one of a set of possible markers that are recognized by the signing authority and the verification system. Evaluating the remainder of that line, there is a prefix "REM" and no suffix, which is an appropriate commenting context for a BAT file, resulting in the marker being ignored during execution and/or evaluation of the file.

Figure 4:
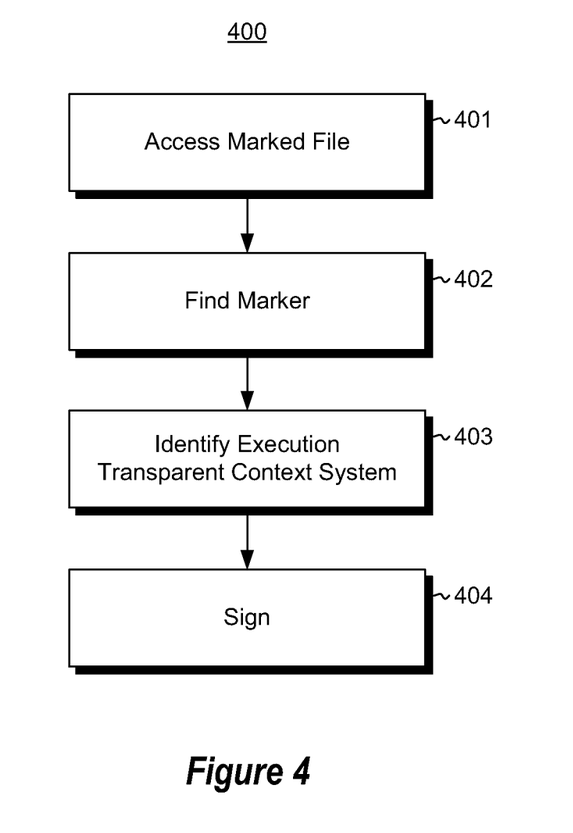
FIG. 4 illustrates a flowchart of a method for signing a file that includes a marker.

FIG. 4 illustrates a flowchart of a method 400 for signing a file. The method 400 may be performed by, for example, the signing authority 221 of FIG. 2. In one embodiment, the signing authority is access controlled such that the identity of the signer, the time of the signing operation and other relevant details are recorded. The signing authority accesses a file (act 401) that includes the marker that is recognized by the signing authority and that is included in the file using an execution transparent context that uses an execution context transparent system. For instance, the marker may be included within a comment line. For instance, in the four examples, the marker is the same "Signature here", and the execution transparent markers are as follows:

| | |
|---|---|
| 1. | <!--Signature here-->> |
| 2. | <!-- |
| | Signature here |
| | --> |
| 3. | # Signature here |
| 4. | REM Signature here |

Thus, although the marker is the same regardless of the file, the execution transparent context may be different depending on the file type. There may not be a single marker that is recognized by the signing authority, but perhaps "Signature here" is one of a number of markers that would cause the signing authority to perform the signing consistent with the principles described herein. In each of the four examples, the execution transparent context system is the commenting system appropriate for the file type.

Once the file is submitted for signature, the signing authority finds the appropriate marker within the file (act 402). For instance, in FIG. 2, the signing authority 221 finds the marker 213 within the accessed file 222 that is to be signed. In the four examples, the marker is the text "Signature here". In another implementation of the embodiment, it could be that the marker is a series of unique bytes understood and/or dictated by the signing authority.

The signing authority also identifies the execution transparent context system (act 403) of the file based on a context of the marker within the file. For instance, referring to FIG. 2, the signing authority 221 identifies the execution transparent context system of the execution transparent context 214 of the marker 213 within the file 212. Once again, this execution transparent context system may be identified by the signing authority without the signing authority having any previous knowledge of the execution transparent context system, or having any knowledge of the schema of the file type. Accordingly, the method 400 may be repeated by the signing authority for any file type as will be demonstrated with respect to the four examples.

The signing authority then modifies the file to include a signature (act 404) placed within an execution transparent context that is canonical to the identified execution transparent context system of the marker. For instance, in FIG. 2, the file 212 is modified to include the signature 223 with the execution transparent context 224 to form signed file 222. In one embodiment, the execution transparent signature (the combination of 223 and 224) is positioned in a predetermined relationship with the execution transparent marker (the combination of 213 and 214) as symbolized by line 225. The signature 223 is generated using a private key 226 available only to the signing authority 221.

The application of the signing process will now be explained with respect to the four examples. An example of the signed file of the first XML example may be as follows:

```
<!--Signature here-->
<!--b0KP/l8wRj+f777HgvcWyEqsMVtI0KCmVehhpwI8pp+YT9vS-
8LpKMOXOZ0MV3O3xeQJua35jO5JyfWpgZQ2zIP1BTEXWsv7wPNv-
OI0m4zQJ8P4EaVx0JDqGBookjqJ2m26bNWZmSyfsE7ywqQJfMReZ-
Adb53EcrcWqCEYyPjCyc=-->
<Person>
</Person>
```

Here, the signing authority found the marker "Signature here" in the authored file and identified the execution transparent context system (i.e., the commenting system in this case) as constituting a prefix "<!--" followed by a suffix "-->". The signing authority generates a unique signature using the private key to encrypt the hash of the file, and generates an execution transparent signature that constitutes the signature with the same prefix "<!--" and the same suffix "-->". The execution transparent signature is before or after the execution transparent marker.

An example of the signed file of the second XML example may be as follows:

```
<!--
Signature here
b0KP/l8wRj+f777HgvcWyEqsMVtI0KCmVehhpwI8pp+YT9vS8LpK-
MOXOZ0MV3O3xeQJua35jO5JyfWpgZQ2zIP1BTEXWsv7wPNvOI0m-
4zQJ8P4EaVx0JDqGBookjqJ2m26bNWZmSyfsE7ywqQJfMReZAdb-
53EcrcWqCEYyPjCyc=
-->
<Person>
</Person>
```

Here, the signing authority found the marker "Signature here" and identified the execution transparent context system (i.e., the commenting system in this case) as not constituting a prefix or a suffix. Instead, the mere positioning of the signature as the next line is sufficient to impart execution transparent to the signature. The signing authority generates a signature using the private key. In this case, the execution transparent context system is satisfied by simple placement of the signature after the marker.

An example of the signed file of the ps1 example may be as follows:

```
# Signature here
# caHYsFlmb6quvVLc1L151oAA5uEF+oEgggbDM9egWSl7aX0Ik8XK-
EUPZPck3iO/kznbwrOR9NUXbChLwmIik1d8WU6agO2nTFqwhPAna-
prdIxCmuwxCU6bFDn2fYpWjKRuwkYosA9QNxZSqbpCJ65ann7At8-
WWfD/Wxi+KDgA1A=
dir c:\
```

Here, the signing authority found the marker "Signature here" and identified the execution transparent context system (i.e., the commenting system in this case) as constituting a prefix "#" and no suffix. The signing authority generates a signature using the private key, and generates an execution transparent signature that constitutes the signature with the same prefix "#". The execution transparent signature is placed right after the execution transparent marker.

An example of the signed file of the BAT example may be as follows:

```
REM Signature here
REM zrZkZPZV4gL3kVuUMLhgNHye/jSZ/L//0lSnj6FH/1+axW2bqA0-
GOe5poeR6gqxt2fVgo2zd52mfIg0NsEW8wPanViJ2heeioZDfhHMLfo-
GDzln0sHjW6Lf4PpHmCwq+/zK40yUGBfC88fMsn4vFeW+SArX-
S0RSM3ULGmY8uYGo=
dir c:\temp
```

Here, the signing authority found the marker "Signature here" and identified the execution transparent context system (i.e., the commenting system in this case) as constituting a prefix "REM" and no suffix. The signing authority generates a signature using the private key, and generates an execution transparent signature that constitutes the signature with the same prefix "REM". The execution transparent signature is placed in a right after the execution transparent marker.

Thus, as can be seen, the execution transparent context system may be identified by the signing authority based on the awareness of a marker, and based on a context of that marker within the file. The signing authority can then insert a signature into the file and in a manner that the signature is execution transparent.

Figure 5:
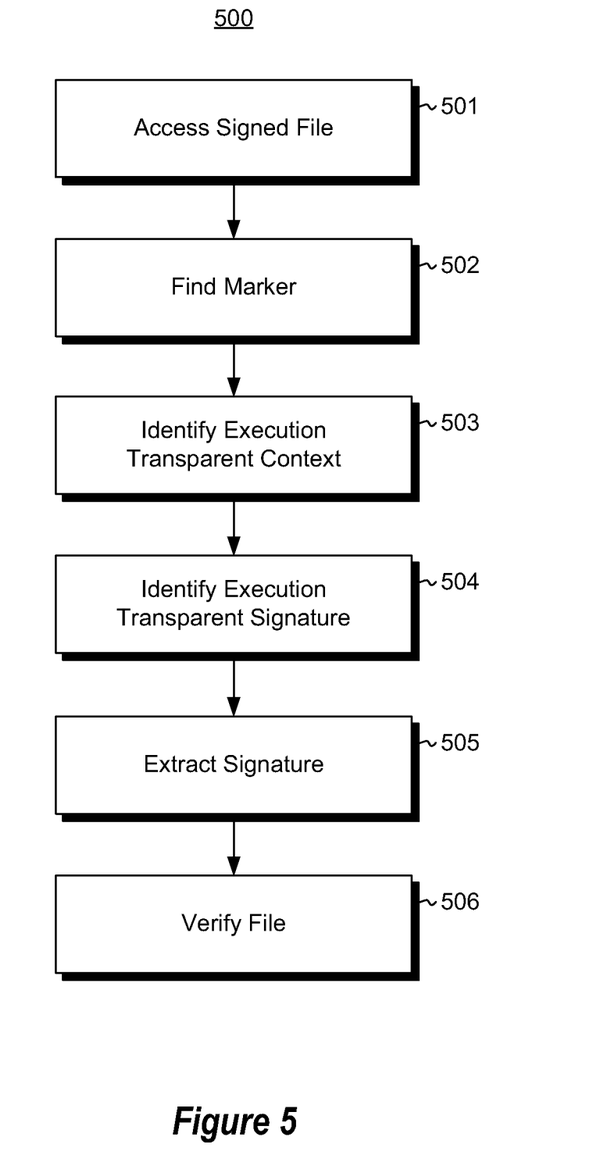
FIG. 5 illustrates a flowchart of a method for verifying that a file has not changed since it was signed using a marker.

FIG. 5 illustrates a flowchart of a method 500 for verifying that a file has not changed since it was signed. The method 500 may be performed by, for example, the verification entity 231 of FIG. 2. The method 500 may be performed for a variety of different types of file types signed by the signing authority.

For any given signed file, the verification entity accesses the signed file (act 501). For example, in FIG. 2, the verification entity 231 accesses the signed file 222. The verification of a signed file may happen at any point after the file is signed, even perhaps days, months, or years from the time of signing and may happen in any computing system which has access to the public key.

The verification entity finds the marker within the file (act 502). For instance, in the above examples, the text "Signature here" is the marker. However, the verification may be configured to detected any number of markers that are also recognized by signing authorities, whose signed files the verification entity may be capable of verifying. In FIG. 2, for example, the verification entity finds the marker 213 within the signed file 222.

Based on the position of the marker, the verification entity may then identify the execution transparent context of the marker (act 503). For instance, in the first XML example, the verification entity identifies the context as corresponding to a prefix "<!--" and a suffix "-->". Note that the verification system need not have any prior knowledge of the execution transparent context system, but may infer it based on the execution transparent context in which the marker appears within the file.

In one embodiment, the execution transparent context is identified based on the text that is in the same line as the marker. However, other rules may be employed by the signing authority and verification entity in order to find the execution transparent context of a marker. For instance, perhaps there is a rule that if there is no prefix for the marker in the same line, the prior line is taken to be the prefix. Referring to FIG. 2, the verification entity 231 identifies the execution transparent context 214 of the marker 213 within the signed file 222. Three additional examples of such rules for finding the execution transparent context of a marker will now be provided.

Take the case of xml or ps1 or bat files presented above. When the signing authority is in the discovery phase, it locates of the text "signature here" and starts backtracking from that text to find the start of the execution transparent context for the marker. In the above text examples, the program identifies a demarcation between the start of the new line and the start of the marker. The intervening data between the new line and the start of the marker identifies the prefix used in the execution transparent context. The program also identifies a demarcation between the end of the marker and start of new line. The intervening data between the end of marker and start of new line identifies the suffix used in the execution transparent context. For instance, in the first XML example, this was solved by assuming the start of the commenting system START marker (as in the case of xml, I mean <!--) is all the bytes after the line break. The same applies for the ending bytes. The three example ways for doing identifying the prefix and postfix are as follows:

First, assume what is after the first line break preceding the marker bytes is the start of the execution transparent marker and assume what is before the first following line break as the execution transparent marker.

Second, another way to solve it is by having the signature authority dictate the number of preceding and following bytes within which the execution transparent marker needs to be embedded. For example, there may be a protocol for the author to embed the bytes corresponding to 'signature here' and have 256 bytes before the marker and 256 bytes after the marker to embed your execution transparent context. The signature authority would then harvest the preceding and following 256 bytes and use it to embed the signature.

Third, another way to solve it is to have the signing authority harvest the length of execution transparent marker from the file itself. So, the signing authority will dictate that the, for instance, 12 bytes following or preceding signature marker will contain the length of the actual execution transparent context the file author has used and will use that information to harvest. These and other methods may be used to identify execution transparent context of a marker.

The verification entity then identifies an execution transparent signature (act 504) within the file based on the identified execution transparent context of the marker within the file. For instance, in accordance with convention, if the execution transparent signature is to be inserted by the signature authority in the line after the execution transparent marker, the verification entity may find the execution transparent signature in the next line of code. Using the general idea described in this document, other schemes may be developed and shared by the signing authority and the verification system to extract the execution transparent context of a file submitted for signing. Referring to FIG. 2, the verification entity may identify the execution transparent signature (represented by the combination of 223 and 224). In one embodiment, the verification entity may extract the execution transparent signature at this point as represented by arrow 202 in FIG. 2.

The verification entity then extracts the signature (act 505) from the execution transparent signature using the identified execution transparent context. For instance, In the first XML example, the verification entity finds the following execution transparent signature:

```
<!--b0KP/l8wRj+f777HgvcWyEqsMVtI0KCmVehhpwI8pp+YT9vS8L-
pKMOXOZ0MV3O3xeQJua35jO5JyfWpgZQ2zIP1BTEXWsv7wPNvO-
```

```
I0m4zQJ8P4EaVx0JDqGBookjqJ2m26bNWZmSyfsE7ywqQJfMReZA-
db53EcrcWqCEYyPjCyc=-->
```

In this case, the signature may be extracted by stripping the execution transparent signature of any prefix (in this case "<!--") and any suffix (in this case "-->") which would result in the extraction of the following signature:

```
b0KP/l8wRj+f777HgvcWyEqsMVtI0KCmVehhpwI8pp+YT9vS8LpK-
MOXOZ0MV3O3xeQJua35jO5JyfWpgZQ2zIP1BTEXWsv7wPNvOI0-
m4zQJ8P4EaVx0JDqGBookjqJ2m26bNWZmSyfsE7ywqQJfMReZA-
db53EcrcWqCEYyPjCyc=
```

Furthermore, the file of the first XML example with the execution transparent signature removed would appear as follows:

```
<!--Signature here-->
<Person>
</Person>
```

Note how the file with the execution transparent signature removed is simply the same as the unsigned file of the first XML example. Referring to FIG. 2, the verification entity 231 extracts (as represented by arrow 204) the signature 223 from the execution transparent signature.

The verification entity then uses the extracted signature to verify the file (act 506). For instance, at this point, the verification entity may hash the unsigned file and compare the resultant hash to the original hash which it unlocked from the signature using the public key to which it is privy. Referring to FIG. 2, this verification is symbolized with arrow 203.

Figure 6:
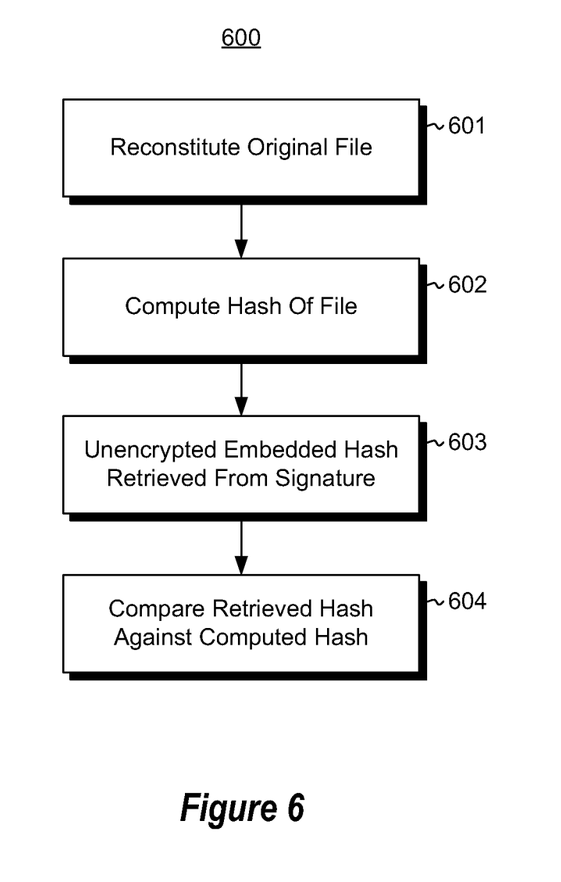
FIG. 6 illustrates a flowchart of a method for using an extracted and computed hash to verify that the file has not changed since it was signed.

FIG. 6 illustrates a flowchart of a method 600 for verifying that the file has not been tampered in any way. The original file is first reconstituted by removing the execution transparent signature (i.e., the combination of 223 and 224 in FIG. 2) (act 601). Then, the hash of the reconstituted file is computed (act 602), and also the hash of the file that was included in the signature is retrieved (act 603), which may involve unencrypting the hash using the public key that corresponds to the private key used to encrypt the hash. The retrieved hash is then compared with the computed hash (act 604). If there is a match, then the file is verified. Otherwise, if the hashes do not match, the file has indeed been tampered with.

Once verified, the file may be understood to not have been altered since the time of signing, thus giving confidence that the file has not been tampered with, and its original functionality may be expected. Thus, the computing system may execute the file, interpret the file, and/or parse the file with confidence that the file will provide the information and/or functionality intended by its author. If desired, the signing authority may keep track of each authoring entity and an authoring history of a file in which each signing action is benchmarked.

Thus, the principles described herein provide for the signing and verification of any type of file using markers that are recognized by the signing authority and the verification entities. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical computer storage media, excluding signals, having stored thereon computer-executable instructions that are structured such that, when executed by one or more processors of a signing authority computing system, cause the signing authority computing system to perform a method for signing a file, the method comprising:
    an act of accessing a file that includes a marker that is recognized by a signing authority, the marker comprising a predetermined data value recognized by the signing authority computing system as indicating a first execution transparent context that is ignored by a consumer of the file, the marker having been inserted into the file by an author or creator of the file within the first execution transparent context, the first execution transparent context being indicated within the file by prefix data prior to the marker and suffix data subsequent to the marker, the marker being usable by the signing authority computing system to identify the prefix data and the suffix data which were used to create the first execution transparent context within the file;
    an act of finding the marker within the file;
    based on finding the marker within the file, an act of identifying how execution transparent contexts are created within the file, including identifying the prefix data prior to the marker as beginning an execution transparent context and identifying the suffix data subsequent to the marker as ending an execution transparent context; and
    subsequent to identifying how execution transparent contexts are created within the file an act of modifying the file to include a signature placed within an execution transparent context by placing the signature between the prefix data and the suffix data of the first execution transparent context, or by placing the signature within a new second execution transparent context created within the file using the identified prefix data and suffix data.

2. The computer program product in accordance with claim 1, wherein the execution transparent context system is a commenting system.

3. The computer program product in accordance with claim 1, wherein the file is a text file.

4. The computer program product in accordance with claim 1, wherein the file is a binary file.

5. The computer program product in accordance with claim 1, wherein the execution context transparent system allows information to be included in the file without affecting the execution or validity of the file.

6. The computer program product in accordance with claim 1, wherein the execution context transparent system allows information to be included in the file without the information being considered by a compiler or interpreter or the program or the consumer of the file or the data in the file.

7. The computer program product in accordance with claim 1, wherein the predetermined data value is limited to any particular layout of bytes.

8. The computer program product in accordance with claim 1, wherein the act of identifying may be performed for each of a plurality of file types to identify a plurality of execution transparent contexts.

9. A computer-implemented method for verifying that a file has not changed since it was signed, the method comprising:
    an act of a computing system finding a marker within the file, the marker comprising a predetermined data value recognized by the signing authority computing system as indicating a first execution transparent context that is ignored by a consumer of the file, the marker having been inserted into the file by an author or creator of the file within the first execution transparent context, the first execution transparent context being indicated within the file by prefix data prior to the marker and suffix data subsequent to the marker, the marker being usable by the signing authority computing system to identify the prefix data and the suffix data which were used to create the first execution transparent context within the file;

based on finding the marker within the file, an act of the computing system identifying how execution transparent contexts are created within the file, including identifying the prefix data prior to the marker as beginning an execution transparent context and identifying the suffix data subsequent to the marker as ending an execution transparent context;

based on identifying how execution transparent contexts are created within the file, an act of the computing system identifying an execution transparent signature within the file, the execution transparent signature being placed between the prefix data and the suffix data of the first execution transparent context, or within a new second execution transparent context created within the file using the identified prefix data; and suffix data; and an act of the computing system extracting a signature from the execution transparent signature using the identified execution transparent context; and an act of the computing system using the extracted signature to verify the file.

10. The computer-implemented method in accordance with claim 9, wherein the act of the computing system using the extracted signature to verify the file comprises:

an act of the computing system removing the execution transparent signature from the file; and an act of the computing system using the signature and the file with the execution transparent signature removed to verify the file.

11. The computer-implemented method in accordance with claim 10, wherein the act of the computing system using the signature and the file with the execution transparent signature removed to verify the file comprises:

an act of generating a hash of the original file with the execution transparent signature removed; and an act of comparing the hash of the file retrieved from the signature embedded by signing authority, using the public key available to the verification system.

12. The computer-implemented method in accordance with claim 9, further comprising:

an act of the computing system executing the file in response to the act of verifying.

13. The computer-implemented method in accordance with claim 9, wherein the execution transparent context system is a commenting system.

14. The computer-implemented method in accordance with claim 9, wherein the file is a text file.

15. The computer-implemented method in accordance with claim 9, wherein the file is a binary file.

16. The computer-implemented method in accordance with claim 12, wherein the marker is a first marker, the file is a first file, the execution transparent context is a first execution transparent context, the method further comprising:

an act of a computing system finding a marker within a second file;

an act of the computing system identifying the execution transparent context of the marker within the second file;

an act of the computing system identifying an execution transparent signature of the second file based on a position of the marker within the second file; and an act of the computing system extracting a second signature from the execution transparent signature of the second using the identified execution transparent context of the marker within the second file; and an act of the computing system using the extracted second signature to verify the second file.

17. A signing authority computer system, comprising:

one or more hardware processors; and one or more physical computer storage media, excluding signals, having stored thereon computer-executable instructions that are structured such that, when executed by the one or more processors of the signing authority computing system, cause the signing authority computing system to perform a method for signing a file, the method comprising:

an act of accessing a file that includes a marker that is recognized by a signing authority, the marker comprising a predetermined data value recognized by the signing authority computing system as indicating a first execution transparent context that is ignored by a consumer of the file, the marker having been inserted into the file by an author or creator of the file within the first execution transparent context, the first execution transparent context being indicated within the file by prefix data prior to the marker and suffix data subsequent to the marker, the marker being usable by the signing authority computing system to identify the prefix data and the suffix data which were used to create the first execution transparent context within the file;

an act of finding the marker within the file;

based on finding the marker within the file, an act of identifying how execution transparent contexts are created within the file, including identifying the prefix data prior to the marker as beginning an execution transparent context and identifying the suffix data subsequent to the marker as ending an execution transparent context; and subsequent to identifying how execution transparent contexts are created within the file, an act of modifying the file to include a signature placed within an execution transparent context by placing the signature between the prefix data and the suffix data of the first execution transparent context.

* * * * *